United States Patent
Lyda

(10) Patent No.: US 8,847,440 B1
(45) Date of Patent: Sep. 30, 2014

(54) POWER SHEDDING DEVICE AND METHOD

(71) Applicant: Edwin Lee Lyda, Conroe, TX (US)

(72) Inventor: Edwin Lee Lyda, Conroe, TX (US)

( * ) Notice: Subject to any disclaimer, the term of this patent is extended or adjusted under 35 U.S.C. 154(b) by 0 days.

(21) Appl. No.: 13/944,792

(22) Filed: Jul. 17, 2013

(51) Int. Cl.
*H01H 31/10* (2006.01)
*H02J 3/00* (2006.01)

(52) U.S. Cl.
CPC ........................................ *H02J 3/00* (2013.01)
USPC .......................................................... 307/115

(58) Field of Classification Search
CPC ................................ H01H 71/70; H01H 89/06
USPC ............................. 307/115; 200/330; 700/295
See application file for complete search history.

(56) References Cited

U.S. PATENT DOCUMENTS

| | | | |
|---|---|---|---|
| 5,905,239 A * | 5/1999 | Turner et al. .................. | 200/330 |
| 6,519,509 B1 | 2/2003 | Nierlich et al. | |
| 6,842,706 B1 | 1/2005 | Baraty | |
| 7,711,651 B2 | 5/2010 | Baraty | |
| 7,774,282 B2 | 8/2010 | Baraty | |
| 7,839,017 B2 | 11/2010 | Huizenga et al. | |
| 2007/0010916 A1 * | 1/2007 | Rodgers et al. ............... | 700/295 |
| 2007/0064377 A1 * | 3/2007 | DeBoer et al. ................ | 361/637 |
| 2011/0054707 A1 * | 3/2011 | Batzler et al. ................. | 700/286 |
| 2012/0055765 A1 * | 3/2012 | Zylstra et al. .............. | 200/50.24 |
| 2013/0335888 A1 * | 12/2013 | Cavazos et al. ............... | 361/624 |

OTHER PUBLICATIONS

Powerlink G3 Lighting Control Systems, Schneider Electric, LaVergne, TN, Jun. 2002.*

* cited by examiner

*Primary Examiner* — Daniel Cavallari
(74) *Attorney, Agent, or Firm* — Mary J. Gaskin

(57) ABSTRACT

A remote-controllable circuit breaker (RCB) is provided for use with a main breaker that permits a user to stop power from being delivered to selected non-critical loads by remotely operating a small motor within one or more RCBs to turn the RCBs off. The user can be the consumer himself, or, if remote access to the RCB has been granted by the consumer, the user can be a retail energy supplier or the consumer's utility company. The RCB's can be installed in the main circuit breaker box, or they can be installed in a subpanel. A communications module with a power supply and a relay operates to change the polarity of the d.c. voltage on an RCB's motor to switch power to a load off or on. The communications module receives input from any standard communications network, such as internet protocol, wi-fi or wi-max.

9 Claims, 6 Drawing Sheets

US 8,847,440 B1

POWER SHEDDING DEVICE AND METHOD

FIELD OF THE INVENTION

The present invention relates to a device and method that uses a standard communications network to shed selected power loads.

BACKGROUND OF THE INVENTION

When power demands exceed available supply, utilities face the problem of how to shed power loads on short notice. The need to shed power loads often occurs during the day, primarily in the afternoon, when the generation of power is not sufficient to meet power needs. Presently, under the new deregulated environment, numerous suppliers offer power for sale on the open market. Each power company must be able to purchase sufficient power for their consumers, typically under contracts with suppliers for certain amounts at specific prices. If demand exceeds those amounts, the power companies have to purchase additional power at the "spot" price of the moment, which is often much higher than the price for power under standard contracts.

An alternative to purchasing expensive power is to cut power usage by consumers during periods of peak demand. Short of rolling blackouts or brownouts, which create havoc, options for shedding loads on a large scale within a short time frame require unreasonable expense for the consumer.

Some might suggest using "smart" meters for such purposes, particularly as more of them are being installed on power grids. However, a power utility company has very limited communications means for its smart meter network. A smart meter can be used to cut power completely at its location or even read a meter, but, presently, it is impractical to use the meters to operate thousands of devices at one time, as the communications rates do not permit a great deal of traffic on the network. Further, even if such capability were to become possible, only the utility could perform such load shedding, not the electrical power provider.

A need exists for a system and device that allows any entity, whether it be the retail energy supplier, the power utility, or the consumer, to cut off a non-critical portion of its power demand, as needed. The system and device should not be part of the power grid, should be past the demarcation of the utility, and should be present at the consumer's own circuit breaker box without requiring relays or extensive re-wiring in the path of the power distribution.

SUMMARY OF THE INVENTION

The present invention is configured to provide retail energy suppliers, power utilities, and consumers the ability to shed part of their power load, reducing the amount of power that would otherwise be needed, particularly during periods of peak demand. The present invention involves an addition to the consumer's circuit breaker box. The present invention does not use a relay in the power distribution circuit. Instead, it uses a remote-controllable circuit breaker (hereinafter "RCB"), operated by a small motor within the breaker. The RCB is designed to operate with a polarity change of d.c. voltage to run the motor in the opposite direction, and it is able to switch 120, 240, or 480 volt three-phase power with ease. The motor within the RCB operates from 24 volt d.c. and is certified for all electrical standards. If the RCB trips, it cannot be reset and turned on remotely; it must be rest manually after the fault has been cleared.

The present invention does not require a computer controller to assess the status and change status for the RCB, since it uses a user of a communications system to simply change the polarity of the d.c. voltage on the RCB's motor that controls the on/off operation of the load.

Control of the transmission of electric power is not through a relay to the load. In fact, it would not be feasible to use relays to shed specific loads, as relays would require adding an electrical panel between the existing breaker and the load. Presently, relays cannot be used in circuit breaker panels in this country. Relays can sometimes arc between the contacts when operating. A relay operates by sending voltage through a coil of wire that induces a magnetic field to operate the contacts. Therefore, such a panel would require approval of various regulating authorities (if such approval would even be granted) before it could be used. A circuit breaker, on the other hand, eliminates arcing and can handle repeated operations safely. Instead of using a relay's magnetic method of electrical opening and closing, a circuit breaker is designed for manual opening and closing of high voltage and high current circuits. Circuit breakers are enclosed in a safe molded case that allows physical operation without hazard.

The present invention uses any standard communications network, such as internet protocol, wi-fi, wi-max, or a specialized communications network that has been installed for other purposes. The communications network can use networks such as the home network router and the consumer's wi-fi. Security methods would be employed to prevent unauthorized access to the network. If the electric utility wishes to use the network, it would have an agreement with the consumer to do so.

The RCBs of the present invention can be installed in the main circuit breaker box or in a subpanel. One or more RCBs will be controlled by a communications module, which allows the on/off switches of the RCBs to be operated remotely; in any event, the switch handle remains in the ON position. Each RCB is connected to an electrical device, one which the consumer considers to be non-critical, such as a pool pump or water heater. The present invention makes it feasible to cut off power only to certain devices rather than entire power loads, allowing critical electrical devices, such as a refrigerator, to continue operating. As an incentive for participating in such a program, electric power suppliers could offer discounts for cutting power to non-critical devices when needed.

It is an object of the present invention is to provide a device and system for shedding non-critical electric power loads without compromising critical power loads.

Another object of the present invention to provide a device and system using existing breaker panels which are already in the distribution path.

Yet another object of the present invention is to provide a device and system which can be remotely controlled by a consumer, a power utility, or an electrical power supplier.

A still further object of the present invention is to provide a device and system which does not require installation of a relay between the RCB and the load.

BRIEF DESCRIPTION OF THE PRIOR ART

Figure 1:
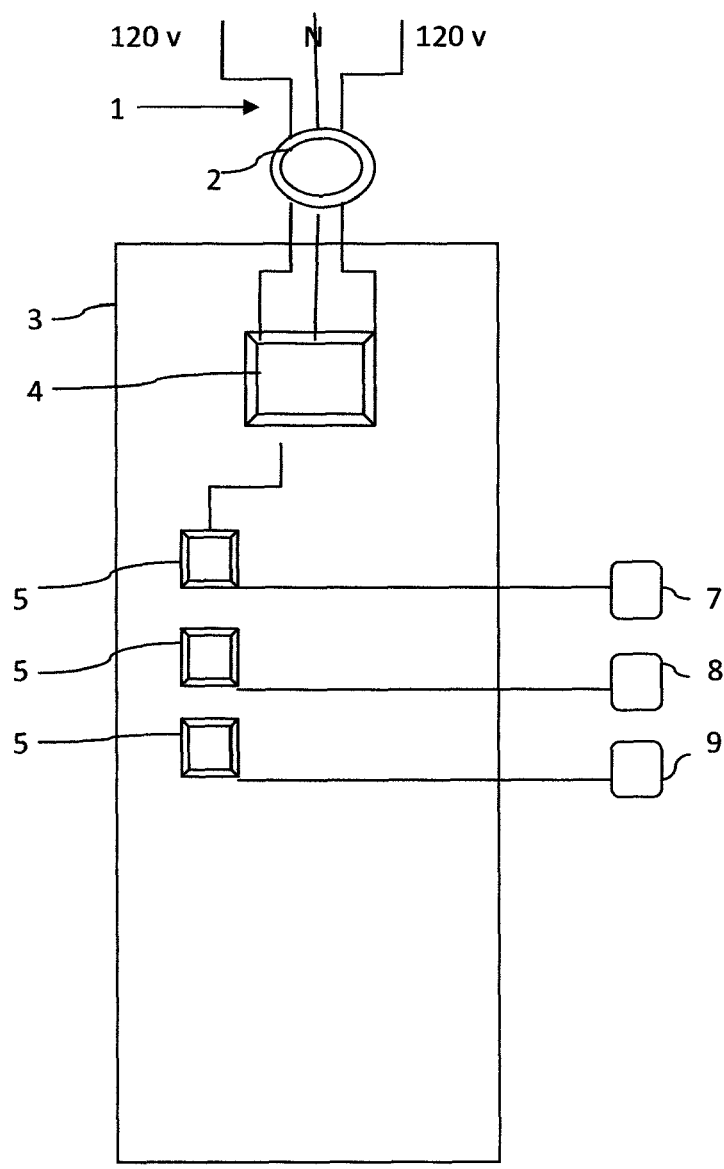
FIG. 1 is a block diagram showing the presently-used arrangement of a breaker panel with a main breaker and circuit breakers connected to different loads.

As seen in FIG. 1, electricity from the power grid 1 is delivered to homes and businesses, traveling through a meter 2 to determine the amount of electricity being used. For safety reasons, the delivery of electricity to various loads is controlled by a breaker panel 3 with a main breaker 4 and a plurality of standard circuit breakers 5, each of which controls the delivery of electricity to a load, i.e. the refrigerator 7, air conditioning 8, or indoor lighting 9. When a circuit breaker 5 is "tripped" for some reason, the flow of electricity is interrupted, and the fault must be cleared before it is reset manually. These circuit breakers 5 cannot be controlled remotely.

BRIEF DESCRIPTION OF THE PREFERRED EMBODIMENT

Figure 2:
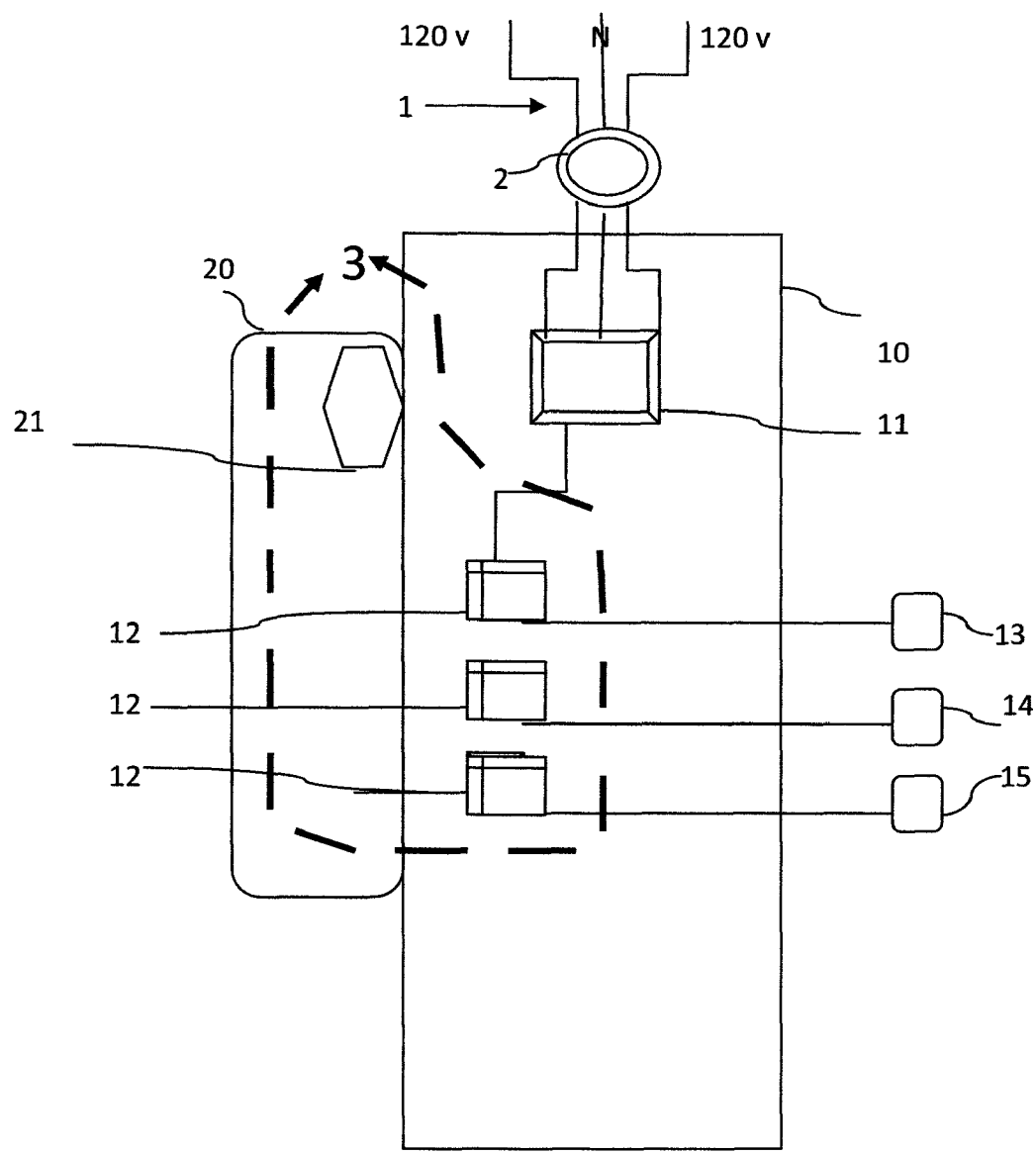
FIG. 2 is a block diagram showing a breaker panel having the remote-controllable breakers (RCBs) of the present invention, each attached to a load.

The present invention allows a power supplier, electric utility, consumer, or other entity to control circuit breakers in the power panel of a home or business using a standard communications method. The block diagram in FIG. 2 shows the arrangement of the present invention. Electricity from the power grid 1 is delivered to homes and businesses in the conventional manner, traveling through a meter 2 to determine the amount used. The breaker panel 10 has a main breaker 11 and a plurality of remote-controllable circuit breakers (hereinafter "RCBs") 12, each of which controls the delivery of electricity to a load, i.e. the pool pump 13, water heater 14, or outdoor lighting 15. Typically, in order to reduce the amount of power being used, the loads selected to be turned off will be non-critical loads, as opposed to essential ones, like a refrigerator. Each of the RCBs 12 is controlled with a 24 v.d.c. low voltage signal and is attached to a communications module 20 with a power supply 21, which allows each RCB 12 to be turned on and off remotely by changing the polarity of the 24 v.d.c. on the RCB motor leads. The communications module 20 can be operated by any originating communications system, including Internet Protocol, wi-fi, or a specialized communications network with a different protocol, as desired. The communications module 20 can be operated without any additional equipment from a local utility or power supplier and without any connection to the utility or power supplier. Any authorized person can turn the RCBs 12 on and off, as desired, to conserve the amount of electricity being used. The consumer may also want to enter into an agreement with the power provider or the electric utility to allow it to have access to the communications module 20 in order to shed specific loads during peak power events. Such an agreement would likely provide the consumer with a discount on his power bill for accommodating the power provider or utility company.

Figure 3:
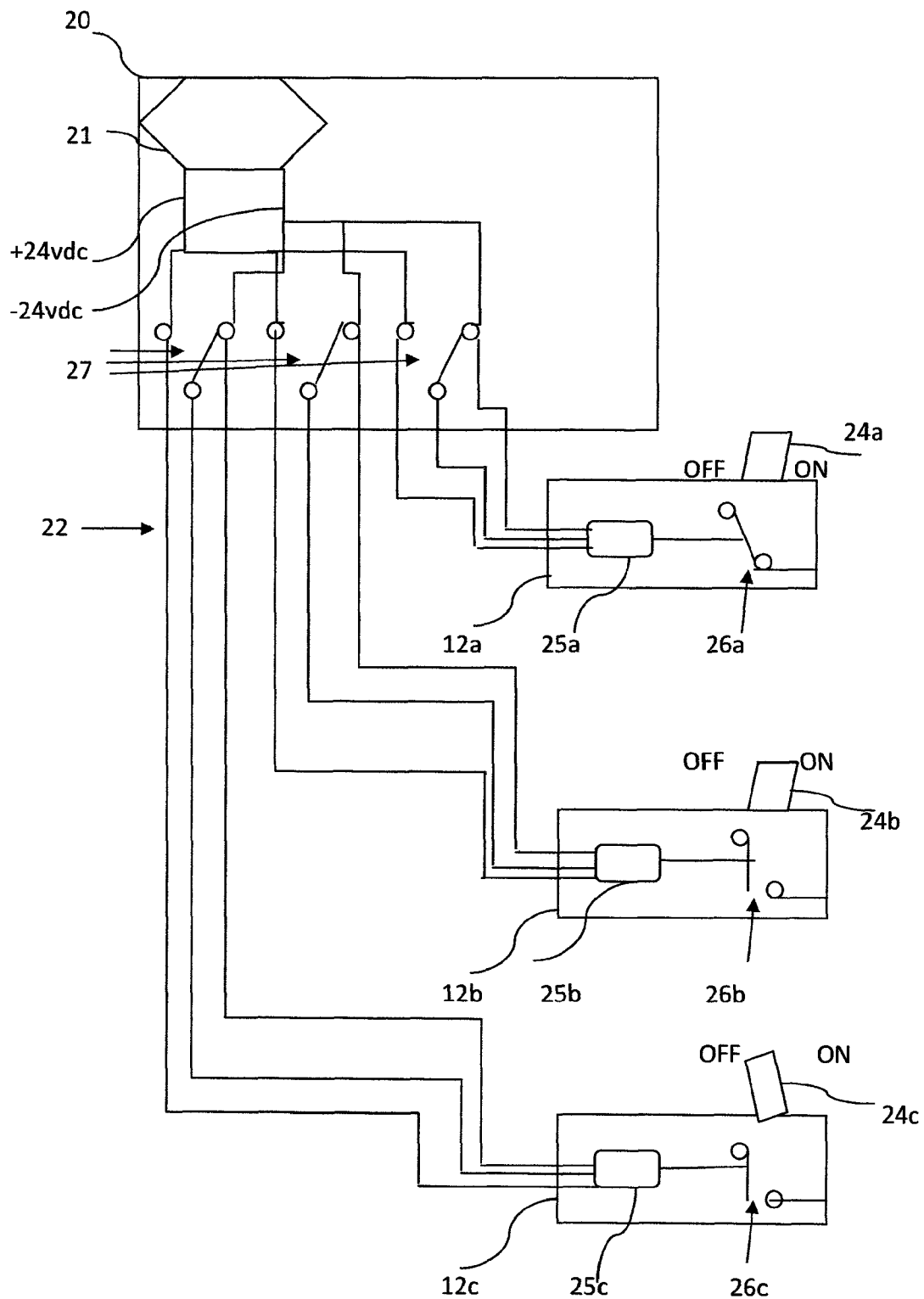
FIG. 3 is a partial detail view of FIG. 2, showing the communications system and the three RCBs in different modes of operation.

As shown in the detail drawing of FIG. 3, each RCB 12a, 12b, 12c has a low voltage motor 25a, 25b, 25c that is connected by wiring 22 to the power supply 21 of the communications module 20, which controls the operation of the RCBs 12a, 12b, 12c remotely with a low voltage signal. Each RCB 12a, 12b, 12c has a manual switch 24a, 24b, 24c which is typically in the ON position, as shown at 24a, 24b but, if tripped, switches to the OFF position, as shown at 24c, whereupon the manual switch 24c must be manually turned back to the ON position shown at 24a, 24b in order to allow power to pass to the load. A signal from the communications module 20 causes the RCB switch contacts 26a, 26b, 26c to move between an ON position shown at 26a and the OFF position shown at 26b, 26c by changing the polarity of the d.c. voltage on the motor 25a, 25b, 25c through a relay 27 in the communications module 20, thereby controlling the flow of power to a load. As shown in FIG. 3, RCB 12a is fully operational, RCB 12b has been switched off remotely, and RCB 12c has had its main switch 24c turned off, so that no power can pass to a load, and RCB 12c cannot be turned on remotely.

Figure 4:
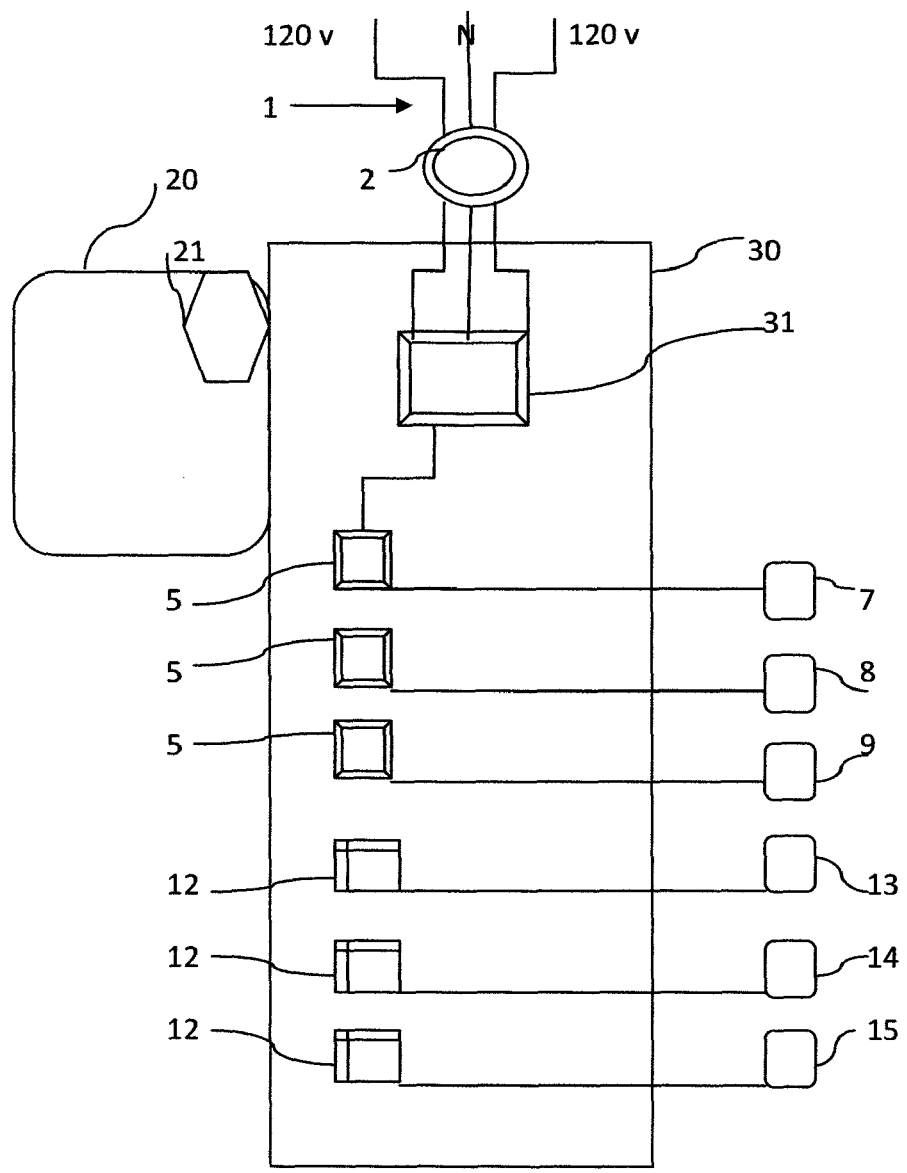
FIG. 4 is a block diagram showing a breaker panel including three standard breakers and three RCBs of the present invention.

The block diagram in FIG. 4 shows the use of the present invention integrated into an existing system. Electricity from the power grid 1 is delivered to homes and businesses, traveling through a meter 2 to determine the amount used. The breaker panel 30 has a main breaker 31 and a plurality of remote-controllable circuit breakers (hereinafter "RCBs") 12, each of which controls the delivery of electricity to each load, i.e. the pool pump 13, water heater 14, or outdoor lighting 15. Typically, the loads turned off will be non-critical loads, as opposed to essential ones, like a refrigerator. Each of the RCBs 12 is controlled with a low voltage signal and is attached to a communications module 20 with a power supply 21, which allows each RCB 12 to be turned on and off remotely. The breaker panel 30 also has plurality of standard circuit breakers 5, each of which controls the delivery of electricity to a load, i.e. the refrigerator 7, air conditioning 8, or indoor lighting 9, which operate in a conventional manner and are not affected by the communications module 20. These standard breakers 5 cannot be operated remotely, unlike the RCBs 12, which can be operated remotely, either individually or as a group.

Figure 5:
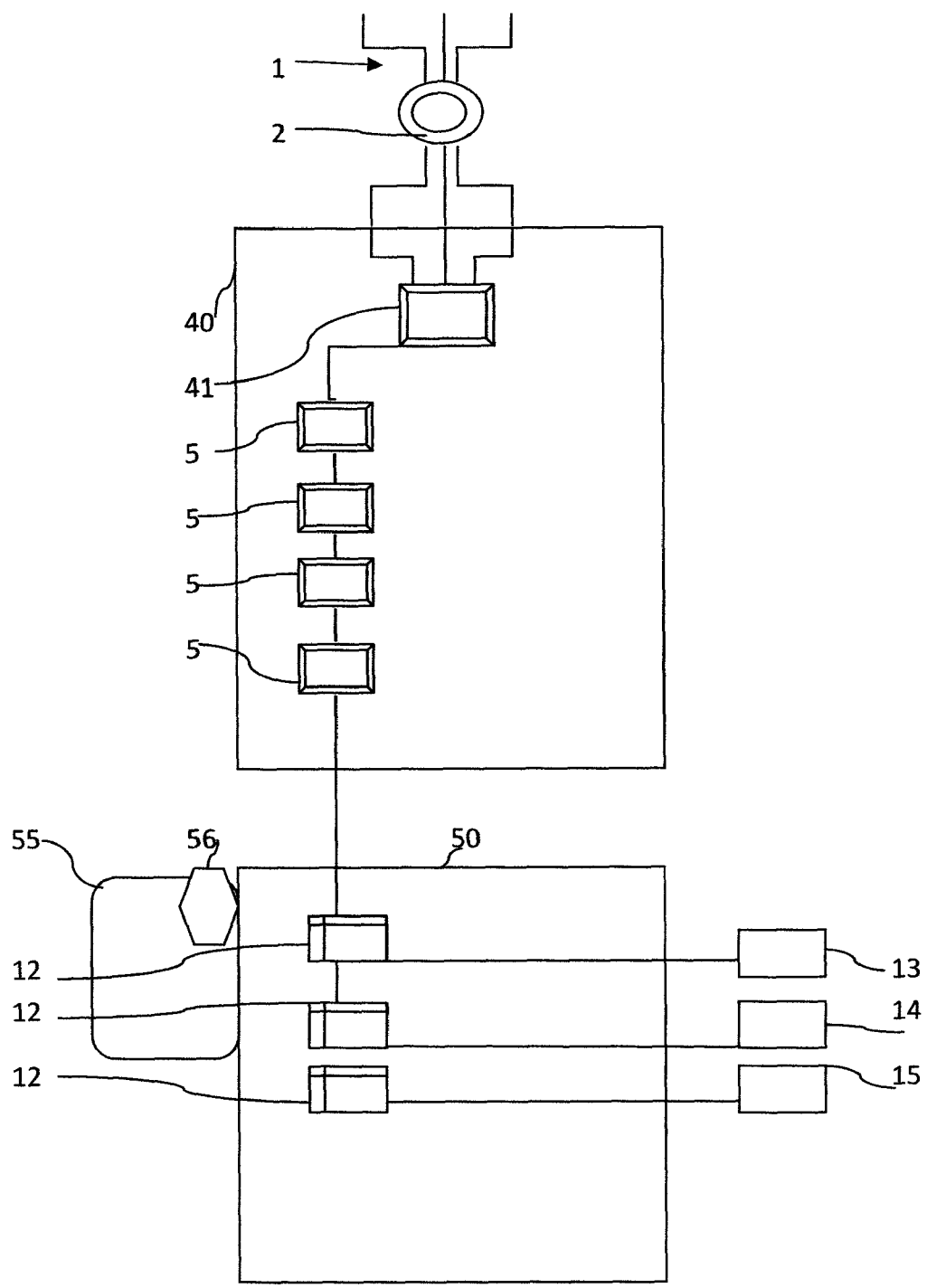
FIG. 5 is a block diagram showing a breaker panel including standard breakers and a subpanel holding the RCBs of the present invention.

The block diagram in FIG. 5 shows the use of the present invention as an add-on to a conventional system. Electricity from the power grid 1 is delivered to homes and businesses, traveling through a meter 2 to determine the amount used. The breaker panel 40 has a main breaker 41 and a plurality of standard circuit breakers 5. A sub-panel 50 has a plurality of RCBs 12, each of which controls the delivery of electricity to a load, i.e. the pool pump 13, a water heater 14, or outdoor lighting 15. Each of the RCBs 12 is controlled with a low voltage 24 v.d.c. signal and is connected to a communications module 55 with a power supply 56, which allows each RCB 12 to be turned on and off remotely.

Figure 6:
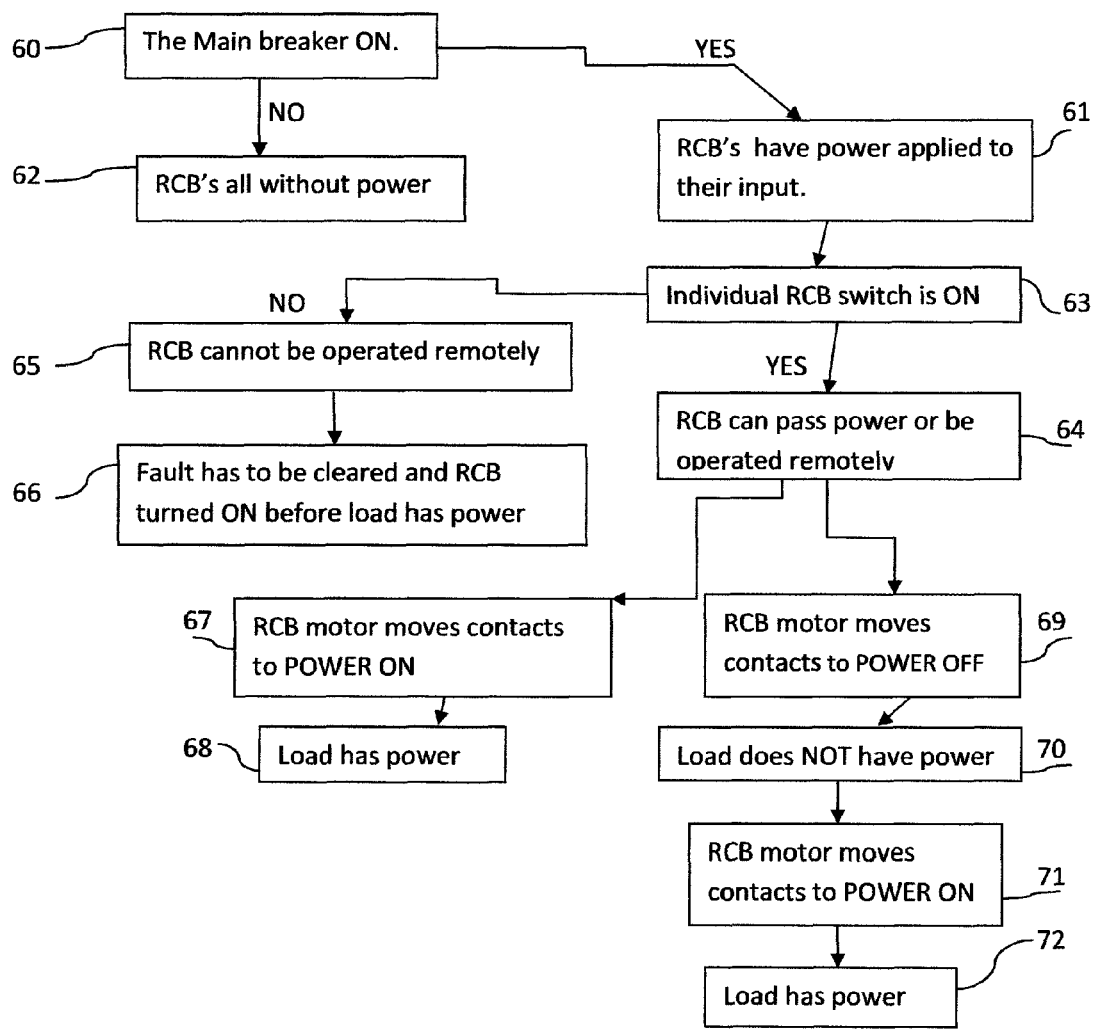
FIG. 6 is a flowchart showing the operation of an RCB of the present invention, in connection with the main breaker.

The flowchart of FIG. 6 describes the normal operation of the system. When the main breaker is ON 60, the RCBs will have power applied to their input 61. If the main breaker is not ON, then the RCBs are all without power 62. When the individual RCB main switch is ON 63, the RCB can pass power or be operated remotely 64. If the RCB main switch is not ON, then the RCB cannot be operated remotely 65. The fault has to be cleared and the RCB's main switch turned ON before power can pass to a load 66. If the remotely-operated RCB switch is turned ON, the RCB motor moves the switch contacts to power the RCB ON 67, and the RCB passes power to the load 68. If the remotely-operated RCB switch is turned OFF, the RCB motor moves the switch contacts to power OFF 69, and the load will not receive power 70. If the remotely-operated RCB switch is turned ON 71, then the load will receive power 72.

The present invention does not require the use of sensors or the operation of a computer/controller at the consumer's location. Instead only a communications module controls each RCB by switching it on and off, without requiring manual intervention. The decision to operate the RCBs is made based on criteria that originates from a source that can be far removed from the consumer's premises. Controlling the RCBs is simple and reliable, while fulfilling all safety requirements.

I claim:

1. A system that allows an entity to shed power loads using a meter, a main circuit breaker, and a breaker panel, the system further comprising:
   (a) at least one remote-controllable breaker comprising a low-voltage motor within the breaker, switch contacts, and a main switch;
   (b) a communications module having a power supply and a relay;
   (c) wiring for connecting the communications module to the remote-controllable breaker;
   (d) a communications system that is remotely activated by the entity to switch the relay in the communications module to change polarity of the motor's voltage,
the remote-controllable breaker controlling delivery of electricity to a load.

2. The system of claim 1 wherein the communications system is selected from the group consisting of Internet Protocol, wi-fi, and wi-max.

3. The system of claim 1 wherein the remote-controllable breaker controls delivery of electricity to the load without having any relay disposed between the remote-controllable breaker and the load.

4. The system of claim 1 which further comprises at least one circuit breaker that cannot be controlled remotely, the circuit breaker installed on the breaker panel.

5. A system that allows an entity to shed power loads using a meter, a main circuit breaker, and a breaker panel having circuit breakers that cannot be controlled remotely, the system further comprising a subpanel having the following:
   (a) at least one remote-controllable breaker comprising a low-voltage motor within the breaker, switch contacts, and a main switch
   (b) a communications module having a power supply and a relay;
   (c) wiring for connecting the communications module to the remote-controllable breaker;
   (d) a communications system that is remotely activated by the entity to switch the relay in the communications module to change polarity of the motor's voltage,
the remote-controllable breaker controlling delivery of electricity to a load.

6. The system of claim 5 wherein the communications system is selected from the group consisting of Internet Protocol, wi-fi, and wi-max.

7. The system of claim 5 wherein the remote-controllable breaker controls delivery of electricity to the load without having any relay disposed between the remote-controllable breaker and the load.

8. A method that allows an entity to shed power loads utilizing the system of claim 1, the method comprising
   having the entity remotely switch the relay in the communications module to change polarity of the motor's voltage, thereby controlling delivery of electricity to the load, whereby when the motor within the remote-controllable breaker is switched off, no electricity can be delivered to the load.

9. The method of claim 8 which uses a communications system selected from the group consisting of Internet Protocol, wi-fi, and wi-max.

\* \* \* \* \*